Feb. 1, 1955
L. H. GILLICK ET AL
2,701,128
TEMPERATURE CONTROL SYSTEM, INCLUDING
SOLAR HEAT COMPENSATING ELEMENTS
Filed Sept. 21, 1949
3 Sheets-Sheet 1
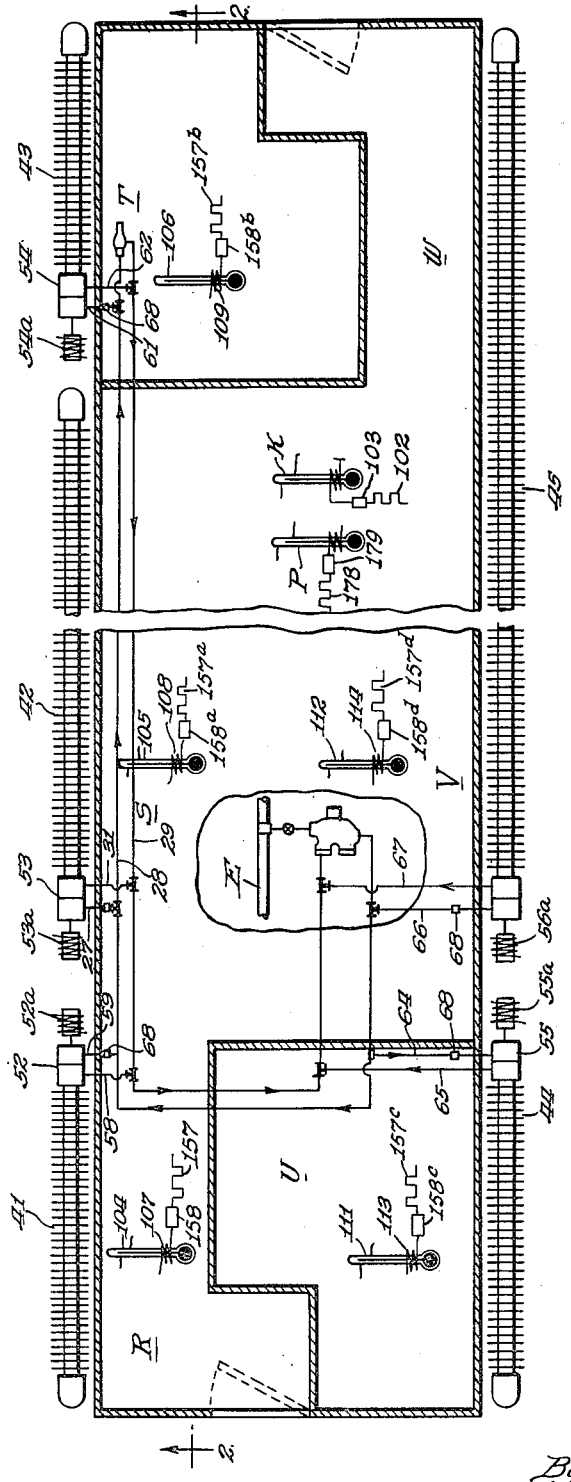
INVENTORS.
Laurance H. Gillick
Timothy J. Lehane
Norman O. Kirkby
By Harvey M. Gillespie Atty

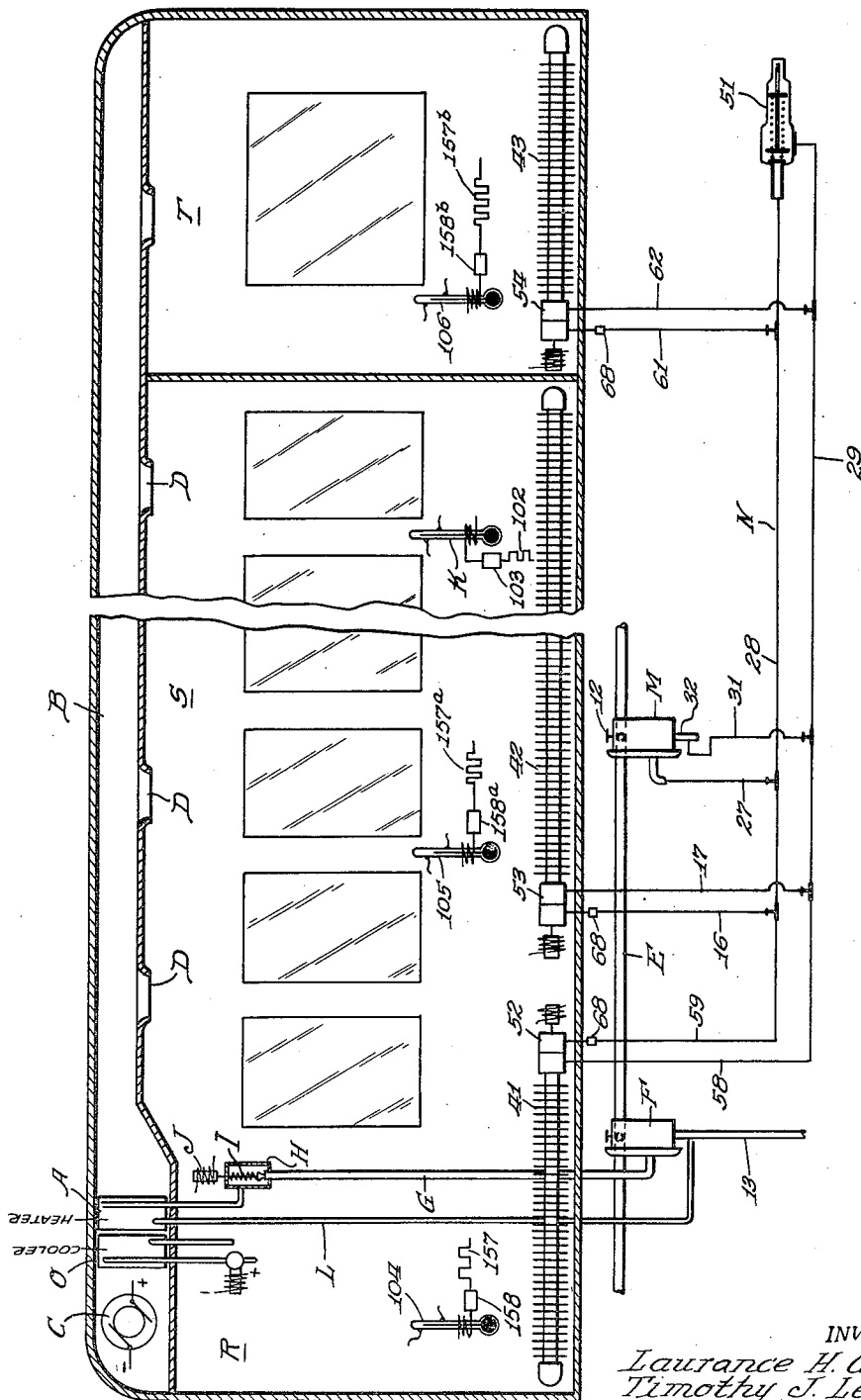

United States Patent Office 2,701,128
Patented Feb. 1, 1955

2,701,128

TEMPERATURE CONTROL SYSTEM, INCLUDING SOLAR HEAT COMPENSATING ELEMENTS

Laurance H. Gillick, Wilmette, and Timothy J. Lehane, North Riverside, Ill., and Norman O. Kirkby, Kalamazoo, Mich., assignors to Vapor Heating Corporation, Chicago, Ill., a corporation of Delaware Application September 21, 1949, Serial No. 116,904

1 Claim. (Cl. 257—3)

This invention relates to space heating and cooling systems, and more particularly, to systems of the above class having temperature control means influenced by solar heat.

One of the objects of the invention is the provision of a heating and cooling system of the above general class in which the temperature control means are influenced by solar heat, thereby taking into account the factor of solar heat in controlling the heating and cooling of the associated space.

Another object of the invention is the provision, in a heating and cooling system, of heating and cooling means operative alternately and intermittently; the said means being controlled simultaneously by thermostatic means having identical functional settings.

A further object of the invention includes the provision, in an electrically actuated temperature control system, of novel control elements which are responsive to temperature changes within an enclosed space and are effective to increase the resistance in the control circuits, during a decline in said temperature and to reduce the resistance in said control circuits, during a temperature rise within said enclosed space.

The invention may be described briefly as comprising a temperature altering apparatus including means for heating and/or cooling an enclosed space. The heating of the space is preferably accomplished by adding heat to a stream of air delivered into the upper portion of the enclosed space whose temperature is being controlled or by adding heat to the air within the space by means of radiators located in selected zones of the space. When it is desired to cool the enclosed space, the said stream is passed through a suitable cooling apparatus which may be made effective independently of the heating apparatus or simultaneously therewith depending upon the current requirements of the enclosed space. When the outside and inside temperatures are such as to require heating only, the cooling apparatus is rendered inoperative. However, when the outside temperature stands at or above a selected temperature, cooling is made available for use when the inside temperature rises to a point where cooling is desirable.

The effectiveness of the several heating elements of the heating apparatus is controlled by means of thermostats which are responsive to the temperature of the enclosed space as a whole and to the temperatures of the several zones thereof and the cooling apparatus is controlled by a thermostat responsive to the general temperature of the space.

In order to take into account the influence of solar heat on the temperature of the enclosure, and to make appropriate adjustments to compensate for the said solar heat, that is to say, reduce the effectiveness of the heating apparatus and to increase the effectiveness of the cooling apparatus, each of the said thermostats are provided with auxiliary electrical heaters whereby their temperature settings can be automatically raised or lowered by varying the supply of heating current to said auxiliary heaters so as to vary their heating effect. This adjustment is taken care of automatically by means of separate temperature sensitive elements connected in series with each of said auxiliary heaters. The said temperature sensitive elements are resistors having negative temperature coefficient of resistance. They are of known construction and may be made of a material such as silicon, copper oxide mixed with sodium as a binder, fused vanadium pentoxide and various other substances which are known to provide resistor elements with a negative temperature coefficient of resistance. For further discussion of the characteristics and constructions of said temperature sensitive resistors reference is made to an article by Becker et al. entitled "Properties and Uses of Thermistors—Thermally Sensing Resistors," published November 1946, Electrical Engineering Transaction, pages 711–725.

The said temperature sensitive elements are preferably enclosed in housings or wrappings so as to shield them to some extent from the ambient air temperatures within the enclosed space. Consequently, the direct heating effect of sunlight on the negative temperature coefficient resistors reduces their individual resistance and, therefore, permits a larger volume of electrical heating current to pass to the auxiliary heaters of the thermostats and thereby lower their effective temperature settings. As a consequence of the adjustment of the thermostats to lower temperature settings, a reduced volume of heat is delivered into the enclosure during the heating cycle of the system. Also a like heating effect on the negative temperature resistors, during the cooling cycle of the system, serves to increase the effectiveness of the air cooler of the system so as to offset any increased heating effects of the solar heat entering the enclosed space. The arrangement of the said negative temperature coefficient resistors in the several zones makes it practical to adjust the delivery of heating and cooling effect to those zones in proportion to the solar heat supplied thereto without affecting the adjustment of the other zones.

Other and further objects and advantages of the invention will become apparent from the following description when considered in connection with the accompanying drawings in which:

Fig. 1 is a diagrammatic plan view of a heating system in accordance with the invention, shown as applied to a railroad passenger car.

Fig. 2 is a longitudinal section view taken substantially on line 2—2 of Fig. 1.

Fig. 3 is a diagrammatic view of a steam supply valve for controlling the delivery of steam to the circulating loop of the heating system.

Fig. 4 is a sectional view illustrating a spring opened solenoid valve for controlling the admission of heating medium to one of the radiating units.

Figure 5:
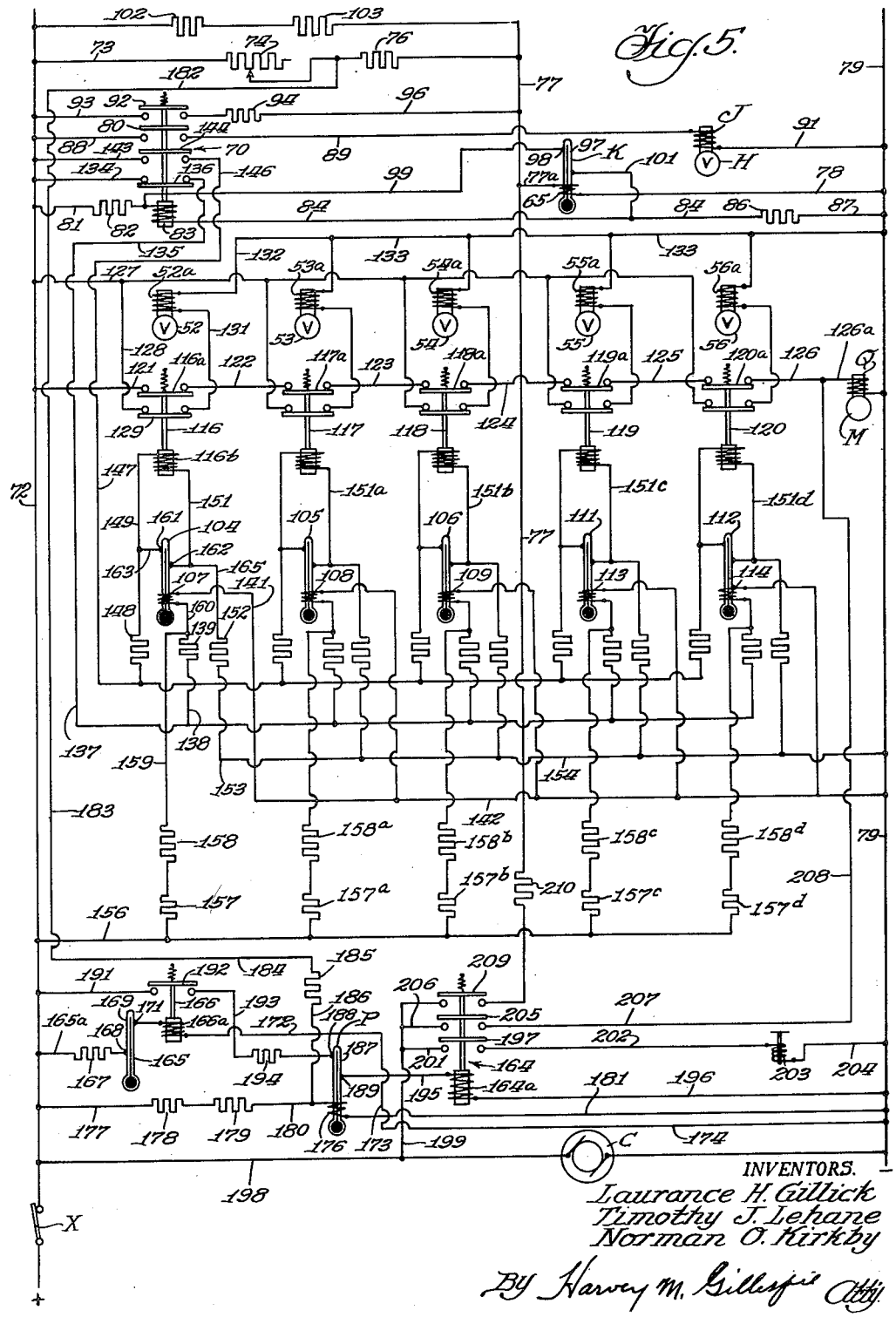
Fig. 5 is a wiring diagram of the electrical circuits for controlling the operations of the several elements of the heating and cooling system.

Referring to the drawings, the invention for purposes of illustration is shown as applied to a railroad passenger car indicated diagrammatically in Figs. 1 and 2. It is to be understood, however, that the invention is not to be limited in its use to the particular application, but may be applied to any space, the temperature of which is to be controlled. The heating and cooling system, as herein illustrated, comprises both heating and cooling apparatus which, under certain conditions, are arranged to operate alternately and intermittently to maintain a predetermined temperature within the space. The respective control means of the heating and cooling apparatus are such as to be influenced in their operation by reason of adjustments which are effected to so control the operations of the heating and cooling apparatus as to vary the heating and cooling effects thereof in relation to the effect of solar heat on the temperature of the space, whereby the said presence or absence of solar heat or the amount thereof supplied is taken into consideration in the functioning of the control elements for controlling the operation of the heating and cooling system. Inasmuch as the solar heat is the most effective during mild and warm weather, the control elements of the system are automatically adjusted by the presence of solar heat, to give effect to the greater volume of solar heat which is normally present during mild and warm weather.

OVERHEAD HEATING APPARATUS

General function

The overhead heating apparatus (Fig. 2) includes a heater A located at one end of an air duct B and a blower C arranged to force a stream of air over the heater A and to deliver the heated air to the upper portion of the enclosed space, said air being delivered through discharge ports D formed in the underside of the duct B. The heater A in the present disclosure utilizes steam as a heating medium, the steam flowing from the steam train line E through a vapor regulator F and a conduit G to an overhead solenoid controlled admission valve H interposed in the conduit G. The said admission valve H is normally closed by a spring I and is opened by the energization of solenoid J. The solenoid J is controlled by temperature responsive means including a thermostat K which is responsive to the general temperature of the car as a whole. For example, when the general temperature of the car falls below the functional setting of the thermostat K, the valve H is opened to admit steam into the overhead heater A. Condensate from the heater A is discharged through return conduit L to drain pipe 13 of the vapor regulator F.

LOWER SPACE HEATING APPARATUS

General function

The lower space heating apparatus cooperates with the overhead heating apparatus to supply heat to the enclosed space, as required, in order to meet the heating requirements of the several zones of the space, each of which may require different amounts of heat so as to maintain the temperature of the zone at a desired level. This apparatus also utilizes steam as a heating medium, the steam being supplied to radiators of the inner feed-pipe type which are located near the floor in the several zones throughout the space. The steam flows from steam train line E at relatively high pressure through a shut off valve 12 into a vapor regulator M, the said regulator functioning to deliver steam, at substantially atmospheric pressure, to a supply loop N which is connected as by risers and return branches, to the supply and return sides of said loop N.

COOLING SYSTEM

The cooling apparatus includes refrigerating unit O located at one end of the air duct B forwardly of the blower C so that air is directed through the cooling unit O and delivered into the open portions of the enclosed space through the discharge ports D formed in the duct B. The cooling unit O, as will be hereinafter described, is controlled by temperature responsive means including a thermostat P which is responsive to the general temperature in the car as a whole and which operates to open or close a circuit to a pilot relay which correspondingly opens or closes a circuit to the said cooling unit.

VAPOR REGULATOR

The vapor regulator M is illustrated diagrammatically in Fig. 3 but it is not claimed herein apart from the combination shown. However, in order to disclose its controlling functions in the present invention its structure and operation are briefly described as follows: Steam from the train line E enters chamber 19 and passes through valve port 21 into chamber 22. When the steam pressure in chamber 22 reaches a predetermined point the pressure actuated valve 23 is closed to a position to maintain the desired pressure in the chamber 22. When steam is required in the steam supply loop N, the steam passes from chamber 22 through a valve controlled port 24 into a low pressure chamber 26 from which it is delivered through conduit 27 into the flow conduit 28 of the steam supply loop N. Any condensate in the return portion 29 of the supply loop N passes through the return conduit 31 to the drain pipe 32. Any steam which may be admixed with the condensate separates therefrom and flows upwardly into a thermostat chamber 33 and applies heat to a bellows form of thermostat 34. The expansion of the bellows thermostat 34 rocks a lever 36 and thereby closes a spring opened valve 37 to close port 24 and thereby shut off the delivery of steam to the flow conduit 28 of the supply loop N. Since the return conduit 31 and thermostat chamber 33 are open to the atmosphere, the steam pressure in the supply loop N will be maintained at substantially atmospheric pressure.

The supply of steam to the circulating loop N may also be cut off by opening a valve 38, thereby to permit steam to pass from chamber 26 through valve port 39 and into thermostat chamber 33. The valve 38 is actuated to open position when the pressure in chamber 26 exceeds a predetermined value, the pressure acting to compress the spring 38a which normally holds the said valve in closed position. Additionally, the valve 38 may be actuated to open position by the energization of solenoid Q. This solenoid is controlled by the action of a cooling pilot relay 164 to insure a cut off of flow of steam to the circulating loop N when the cooling apparatus is in operation.

LOWER ZONE HEATING APPARATUS

The enclosed space, which by way of illustration is shown as embodied in the form of a railroad passenger car, is divided into several zones designated R, S, T, U, V, and W. The said zones are served by radiators, designated respectively, by the numerals 41, 42, 43, 44, and 45. Each of the said radiators is preferably of the inner-feed pipe type which is illustrated clearly in Fig. 4 and includes inner and outer pipes 47 and 48 respectively, the said pipes being in concentric relation. The outer pipe 48 is provided on its surface with a plurality of heat radiating fins 49 and a cap 50 is mounted on the outer pipe 48 at the outlet end of inner pipe 47.

Steam is delivered to the several radiators by means of a main supply loop, indicated generally by the letter N. If desired, the said loop may be located between the main and sub flooring of the car, so as to avoid undue dissipation of heat to the outer atmosphere, and comprises a supply conduit 28 and a return conduit 29. A pressure responsive valve 51 connects the remote end of the supply conduit 28 with the inlet end of the return conduit 33. When the pressure in the supply conduit 28 is sufficient to unseat the valve 51, steam will flow through the supply loop N. Since the return conduit 29 discharges into the atmosphere through conduit 31, it will be apparent that pressure in the supply conduit 28 must always be above atmospheric pressure in order to effect circulation of the heating medium through the supply loop.

It will be observed that the inlet end of each radiator 41, 42, 43, 44, and 45 is provided with a separate solenoid operated admission valve 52, 53, 54, 55 and 56 respectively. Considering the valve 53 for radiator 42, shown in Figs. 1 and 4 as representative, it is seen that valve 53 is connected by branch conduit 16 to the supply conduit 28 of the circulating loop N and that the outlet end of radiator 42 is connected by branch conduit 17 to the return conduit 29 of the circulating loop N. The valve stem 50 is normally held in open position by means of a spring 57 so that steam will flow from the pressure conduit 28 of the supply loop N, through branch conduit 16, to admission valve 53 and thence through inner feed pipe 47 of the radiator to outer radiator pipe 48. The condensate from the radiators and a small amount of non-condensed steam is discharged from the radiators through branch conduit 17 into the return conduit 29 of the loop N.

The radiator units 41 and 43 are connected with the supply and return conduits 28 and 29 respectively, of the supply loop N, in substantially the same manner, as described with respect to radiator 42. For example, for purposes of further clarification, the inlet and outlet ends of radiator 41 are connected into the supply loop N by branch conduits 58 and 59, and corresponding ends of radiator 43 are connected into the return side of the loop by branch conduits 61 and 62. Additionally, radiator 44 is connected into the supply loop N by branch conduits 64 and 65, and radiator 45 is connected into the said loop by branch conduits 66 and 67. In each of the branch conduits leading from the pressure conduit 28 of the loop N to a radiator admission valve identified by the numerals 52-56, there is interposed an orifice fitting 68. The orifice passages of the said fittings are so proportioned, having regard to the pipe friction, location and heating requirements of the several radiators, as to balance the distribution of heating medium among several radiators. Since all of the admission valves are normally open, in order to close the said valves, it is necessary to energize their associated solenoids 52a, 53a, 54a, 55a, and 56a.

The operation of the improved heating system will best be understood by reference to Fig. 5 which shows the electrical wiring diagram thereof.

CONTROL CIRCUITS

Overhead heating apparatus

Considering first, the electrical circuits for opening the overhead steam admission valve H to deliver steam to the heater A, these circuits are closed through a main relay switch 70 under the control of thermostat K, the said thermostat is provided with an electrical auxiliary heater 65 which for the purpose of establishing its functional setting, receives electrical heating current when switch X is closed through a circuit leading from positive line 72, through wire 73, variable resistor 74, fixed resistor 76, wires 77, 77a, auxiliary heater 65, wire 78 to the negative line 79. The total resistance in this circuit may be regarded, for purpose of illustration, as establishing the functional setting of thermostat K at 76° F.

When the thermostat K calls for heat, the relay switch 70 is energized to close through its contact 80 a circuit for energizing the solenoid J of steam valve H, thereby to deliver steam to the overhead heater A. The circuit for energizing the said relay 70 leads from positive line 72 through wire 81, resistor 82, relay solenoid 83, wire 84, resistor 86, wire 87 to the negative line 79. Closing of the said relay establishes the energizing circuit for the solenoid J of steam valve H which circuit is as follows: Positive line 72, wire 88, closed relay contact 80, wire 89, solenoid J and wire 91 to negative line 79.

Simultaneously with the energization of the said circuit for opening the steam valve H, a circuit is closed through closed contact 92 of relay switch 70 to establish a circuit for applying additional heating current to auxiliary heater 65 of thermostat K. This circuit leads from positive line 72, wire 93, relay contact 92, cycle resistor 94 which has a heat control value of 2° F., wire 96, wires 77, 77a, heater 65 and wire 78 to the negative line 79. The two degrees of heat added to thermostat K, as a result of the last mentioned circuit, reduces the temperature setting of thermostat K to 74° F. until its mercury column 97 engages its contact 98. This functioning of thermostat K results in the deenergization of relay 70, since, under such conditions, the electrical current is by-passed around the relay solenoid 83. This by-passing circuit leads from the positive line 72, through wire 81, resistor 82, wire 99, contact 98, through the mercury column 97, wire 101, wire 84, resistor 86, and wire 87 to the negative line 79. The said deenergization of relay switch 70 opens relay contact 92 and therefore removes the two degrees of heat which was supplied through resistor 94 to the auxiliary heater 65 of thermostat K. The auxiliary heater therefore cools and then opens thermostat K at its contact 98 which action again results in reenergizing the solenoid 83 of relay 70. The cycling action of thermostat K will continue and momentary bursts of steam will be delivered to the air heater A until the temperature of the enclosed space being heated is sufficient to maintain the mercury column 97 in engagement with contact 98.

As will be observed in the wiring diagrams shown in Fig. 5, the variable resistor 74 and resistor 76 together with resistors 102 and 103 function to control the initial temperature setting of the auxiliary heater 65 of thermostat K. The said resistors 102, 103 are connected in series with each other but in parallel relationship with variable resistor 74 and resistors 76 and 94. The resistor 102 is of the conventional type of fixed resistance value, but the resistor 103 is a temperature sensing resistor of the negative temperature coefficient type. It is positioned in a location so as to be directly influenced by solar heat for example sunlight entering the enclosure or the direct effect of the sun's rays through the windows and wall panels of the enclosure.

The negative temperature coefficient resistor 103 functions contrary to the general physical law applicable to electrical resistance element in that application of heat to a resistor of this type decreases its resistance, while in the case of conventional resistors the electrical resistance thereof is increased by the application of heat. The negative temperature coefficient resistor 103 is enclosed in a housing so that it is shielded to some extent from the heating and/or cooling effects of the ambient air temperatures within the enclosure or zone where the temperature is being controlled, but does not affect its ability to absorb radiant and particularly solar heat. Since, the effect of solar heat is increased during mild weather, for example above 50° F., it will be apparent that as the temperature in the space rises in response to solar heat, the influence of the solar heat on the negative temperature coefficient resistor will correspondingly increase. In very cold weather and during the night season, the effect of solar heat on the space is so small as to be negligible. Accordingly, it will be apparent that the volume of solar heat present in the form of sunlight at a given time is taken into account in controlling the apparatus for heating and cooling the space.

It can be readily seen that as the temperature in the zone or space rises due to the effect of solar or radiant heat, the current through resistor 103 is increased because the increased temperature of the space reduces the resistance through resistor 103 proportionately to the rise in temperature in the space. Thus, it will be apparent that as the temperature in the space rises, the heating current to the auxiliary heater 65 is proportionately increased, thereby influencing the operation of the thermostat K.

*Control circuits lower zone heating apparatus*

Referring now to the circuits for controlling the operation of the several radiators located in the various zones; the radiators 41, 42, and 43 located in zones R, S and T, at one side of the car, are controlled by their individual thermostats 104, 105, and 106 provided with electrical heaters 107, 108, and 109 respectively. The radiators 44 and 45 located on the other side of the car are controlled by thermostats 111, and 112 provided with electrical heaters 113 and 114 respectively. The several thermostats just described are set to function at the same temperature as thermostat K, for example 76° F., and the auxiliary heaters of the said thermostats have the same heat control value (2° F.) as the electrical heater 65 of the main thermostat K. Each of the auxiliary heaters of the thermostats is connected in circuit with two resistors, one of which is of the negative temperature coefficient type, hereinabove described. Thus, each thermostat in its function is influenced by solar or radiant heat in the zone in which it may be located.

Each of the steam admission valves 52–56 is normally open, consequently, when there is a call for heat by any of the thermostats 104, 105, 106, 111 or 112, steam is admitted into the associated radiating unit. However, the delivery of steam to the circulating loop N is controlled by vapor regulator M, the solenoid Q of which is connected in series with a group of relay switches 116, 117, 118, 119, and 120, the said relays being connected in parallel with the relay switch 70. Since the steam admission valves 52, 53, 54, 55, and 56 are normally open, steam from the circulating loop N would flow through the said valves into the associated radiating units. However, when there is no call for heat by any of the thermostats in the various zones, the solenoid Q of vapor regulator M is energized through a circuit leading from positive line 72, wire 121, relay contact 116a, wire 122, relay contact 117a, wire 123, relay contact 118a, wire 124, relay contact 119a, wire 125, relay contact 120a, wire 126 and solenoid Q to negative line 79. Energization of the solenoid Q effects opening of valve port 39 in the vapor regulator M and permits steam to flow into chamber 33 effecting expansion of the bellows unit 34 which rocks the arm 36 and closes the valve port 24 shutting off the entrance of steam into the circulating loop N. Correspondingly, the solenoids 52a–56a of steam admission valves 52 to 56 inclusive, are energized to close the said valves, the energizing current for valve solenoid 52a, for example, leading from positive line 72, wire 127, wire 128, relay contact 129, wire 131, solenoid 52a, wire 132, wire 133 to negative line 79.

When the relay 70 is deenergized, as when there is no call for heat by thermostat K heating current is supplied to the several auxiliary heaters, the heating circuit, for example, for the heater 107 leading from positive line 72, wire 134, relay contact 136, wire 135, wire 138, cycling resistor 139, through heater 107, wire 141, and wire 142, to negative line 79. Auxiliary heat is applied to the thermostat 104 by heater 107 to cause the mercury column of the thermostat to rise to its functional setting. However, the said thermostat, under the conditions above described, is not operative since the contact 144 of relay 70 is open.

When the relay 70 is energized, as when there is a call for heat by thermostat K, the heating current for heater 107 is reduced by the opening of contact 136, and if thermostat 104 is cold, relay 116 is energized through a circuit leading from positive line 72, wire 143, relay contact 144, wire 146, wire 147, resistor 148, wire 149, through relay solenoid 116b, wire 151, resistor 152, wire 153, and wire 154 to negative line 79. The energization of relay 116 effects a disengagement of relay contact 116a from its associated points and opens the circuit to solenoid Q of vapor regulator M, thus effecting closing of the valve 39 and permitting steam to pass through the open port 24 into chamber 26 and through conduit 27 into the circulating loop N. Correspondingly, relay contact 129 is disengaged from its associated points and effects a de-energization of solenoid 52a of steam admission valve 52 which causes the said valve to open to permit steam to pass into its associated radiator. It will be apparent, that as any one of the relays 116, 117, 118, 119, or 120 is energized, the circuits hereinabove described are opened to effect the admission of steam into the circulating loop N and the radiating units.

When relay 70 is energized, relay contact 136 is separated from its associated contact points, and accordingly, the circuit supplying current to the auxiliary heater 107 is opened so that current is no longer supplied to the said auxiliary heater through relay 70. However, heating current is still supplied to the auxiliary heater 107 through a circuit leading from positive line 72, conductor 156, resistor 157, negative coefficient resistor 158, wire 159, wire 160, through auxiliary heater 107, wire 141 and wire 142, to negative line 79. The heat added to the heater 107, as a result of the last mentioned circuit, reduces the temperature setting of thermostat 104 until its mercury column engages contacts 161 and 162. This functioning of the thermostat results in the deenergizing of relay 116, since, under such conditions, the electrical current is by-passed around the relay solenoid 116b. This by-passing current leads from the positive line 72, wire 143, relay contact 144, wire 146, wire 147, resistor 148, wire 163, through the mercury column of thermostat 104, wire 165, resistor 152, wire 153, and wire 154 to negative line 79.

The radiators 42, 43, 44, and 45 are controlled in the same manner as radiator 41 by means of thermostats 105, 106, 111 and 112. Since the energizing circuits for the solenoids of steam admission valves 53, 54, 55 and 56 are identical, as is also true of the energizing circuits for relays 117, 118, 119, 120 and auxiliary heaters 107, 108, 109, 113 and 114, in order to avoid repetition of description of the several circuits corresponding portions are identified by the same reference numerals with the addition of exponents, *a*, *b*, *c* and *d*.

CONTROL CIRCUIT COOLING APPARATUS

The operation of the cooling apparatus O is controlled by a cooling pilot relay 164 which is in turn controlled by thermostats P and 165. The thermostat 165 when its functional setting has been reached serves to energize relay 166, the energizing circuit leading from positive line 72, wire 165a, resistor 167, contact 168, mercury column 169, contact 171, solenoid 166a of relay 166, wire 172, wire 173, and wire 174, to negative line 79. Thermostat P is provided with an auxiliary heater 176 and heating current therefor is supplied through a circuit leading from positive line 72, conductor 177, resistor 178, negative coefficient resistor 179, conductor 180, through auxiliary heater 176, and wire 181 to negative line 79. Additional heat is supplied through a circuit leading from positive line 72, wire 73, variable resistor 74, wire 182, wire 183, wire 184, cycling resistor 185, wire 186, through auxiliary heater 176, wire 181, to negative line 79. The variable resistor 74 may be set to establish the functional setting of thermostat P as well as thermostat K, hereinbefore described, This temperature setting may be raised or lowered by appropriate adjustment of the variable resistor 74. The heat to thermostat P as a result of the last mentioned circuit reduces the temperature setting of the said thermostat until its mercury column 187 engages the contacts 188 and 189

This functioning of the thermostat P results in energizing cooling pilot relay 164, the energizing circuit leading from positive line 72, wire 191, relay contact 192, wire 193, resistor 194, through mercury column 187, contact 189, wire 195, relay solenoid 164a and wire 196 to negative line 79. The energization of the relay 164 closes relay contact 197 and therefore initiates the operation of the cooling apparatus by energizing a cooling relay switch 203, the energizing circuit therefor leading through positive line 72, wire 198, wire 199, wire 201, relay contact 197, and wire 202 to the cooling apparatus relay switch 203, wire 204 and to line 79. Simultaneously, relay contact 205 is closed completing an energizing circuit through the solenoid Q of vapor regulator M, the energizing current leading through positive line 72, wire 198, wire 199, wire 206, relay contact 205, wire 207, wire 208, wire 126a, through solenoid Q and to negative line 79. Thus, as was hereinabove described, the valve port 24 in vapor regulator M is closed, shutting off the admission of steam into the circulating loop N and thereby preventing the circulation of steam through any of the radiating units. Additionally, when relay 164 is energized relay contact 209 is closed thereby establishing a circuit to auxiliary heater 65 of thermostat K. This heating circuit leading from positive line 72, wire 198, wire 199, relay contact 209, resistor 210, wire 77, wire 77a, through heater 65 and wire 78 to negative line 79. Thus, the temperature setting of thermostat K is reduced, which action as was hereinabove described, results in deenergizing of relay 70, thereby insuring that no heating medium will be delivered to the heater A while the cooling apparatus is in operation.

It will be apparent from the foregoing that the means controlling the operation of the heating and cooling apparatus function simultaneously so as to provide for alternate intermittent operation of said heating and cooling apparatus.

We claim:

A temperature control system for controlling the temperature of an enclosed space comprising a heating apparatus and a cooling apparatus the heating apparatus including a heating unit and a solenoid valve for controlling the admission of heating medium thereto, a second heating apparatus including a heat radiating unit, a main solenoid valve and a second solenoid valve for controlling the admission of heating medium thereto, the cooling apparatus including a thermostat and a relay switch for controlling the operation thereof, means including a thermostat and a relay switch associated therewith for controlling the energization of said first mentioned solenoid valve, means including a thermostat and a relay switch associated therewith and electrically connected through said second mentioned relay switch for controlling the energization of said main and said second solenoid valves, the first mentioned relay switch having an energized closed contact connected in a by pass circuit to said main solenoid valve, whereby energization of said first mentioned relay switch is effective to energize said main solenoid valve to prevent the admission of heating medium into said second mentioned radiating unit.

References Cited in the file of this patent

UNITED STATES PATENTS

| | | |
|---|---|---|
| 2,171,803 | Parks et al. | Sept. 5, 1939 |
| 2,323,236 | Parks et al. | June 29, 1943 |
| 2,339,635 | Hall | Jan. 18, 1944 |
| 2,488,209 | Lehane et al. | Nov. 15, 1949 |
| 2,489,652 | Lehane | Nov. 29, 1949 |